United States Patent
Wang et al.

(10) Patent No.: US 7,855,863 B2
(45) Date of Patent: Dec. 21, 2010

(54) DRIVER WITH ELECTROSTATIC DISCHARGE PROTECTION

(75) Inventors: Dening Wang, McKinney, TX (US); Yuan Gu, Dallas, TX (US); Lin Chen, Mountain View, CA (US); Jonathan Scott Brodsky, Richardson, TX (US); Wei-Chung Wu, Richardson, TX (US); Wenliang Chen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 101 days.

(21) Appl. No.: 12/274,085

(22) Filed: Nov. 19, 2008

(65) Prior Publication Data

US 2010/0123985 A1 May 20, 2010

(51) Int. Cl.
*H02H 9/00* (2006.01)
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl. ............................. 361/56; 361/118
(58) Field of Classification Search ............. 361/56, 361/118
See application file for complete search history.

(56) References Cited

U.S. PATENT DOCUMENTS

| | | | | |
|---|---|---|---|---|
| 7,529,070 | B2* | 5/2009 | Bhattacharya et al. | 361/56 |
| 2005/0077916 | A1* | 4/2005 | Mecier et al. | 326/38 |
| 2008/0030910 | A1* | 2/2008 | Fairgrieve | 361/56 |
| 2008/0316660 | A1* | 12/2008 | Huang et al. | 361/56 |

* cited by examiner

*Primary Examiner*—Dharti H Patel
(74) *Attorney, Agent, or Firm*—John J. Patti; Wade J. Brady, III; Frederick J. Telecky, Jr.

(57) ABSTRACT

Various apparatuses, methods and systems for protecting a driver from electrostatic discharge are disclosed herein. For example, some exemplary embodiments provide a driver, including a buffer, a leakage path blocking transistor connected to an output of the buffer, and an output driver connected to an output of the leakage path blocking transistor. Current from the output driver to the buffer is substantially blocked by the leakage path blocking transistor.

7 Claims, 5 Drawing Sheets

DRIVER WITH ELECTROSTATIC DISCHARGE PROTECTION

BACKGROUND

Integrated electronic circuits often have drivers at the outputs to drive current through external devices. For example, integrated circuits used to illuminate light emitting diodes (LEDS) may use a driver at the output of the integrated circuit which sinks electrical current from the LEDS to turn them on. However, the drivers at the outputs of integrated circuits are particularly sensitive to damage from electrostatic discharge, or ESD, because they are connected immediately inside the outputs of the integrated circuit and are therefore exposed to high electrical voltage and resultant currents caused by ESD. Integrated circuits are particularly vulnerable to ESD before they are soldered or otherwise electrically connected to a circuit board with ground and power rails. The voltage in an ESD strike can be as high as thousands of volts, even from a static discharge from a persons touch. Although the current from such an ESD strike may be relatively low, without ESD protection for the driver the transistors in the driver may be destroyed.

One solution used to protect drivers from ESD strikes is to include an ESD protection cell at the output transistor of the driver. The ESD protection cell reacts more quickly than the output transistor, dissipating current from the ESD strike through the ESD protection cell before it can damage the output transistor. However, for a high voltage output driver, the ESD protection cell must be undesirably large and is therefore not an ideal solution.

SUMMARY

Various apparatuses, methods and systems for protecting a driver from electrostatic discharge are disclosed herein. For example, some exemplary embodiments provide a driver, including a buffer, a leakage path blocking transistor connected to an output of the buffer, and an output driver connected to an output of the leakage path blocking transistor. Current from the output driver to the buffer is substantially blocked by the leakage path blocking transistor.

Other embodiments provide a method of protecting a driver from electrostatic discharge. When an electrostatic discharge strike is received on a drain of an output driver transistor, leakage current away from a gate of the output driver transistor is blocked. A voltage level at the gate of the output driver transistor is increased through capacitive coupling from the drain of the output driver transistor. This reduces a drain-to-source resistance of the output driver transistor. A current from the electrostatic discharge strike is dissipated through a drain-to-source path of the output driver transistor to a ground rail.

In other instances of the aforementioned method, the current from the electrostatic discharge strike is further dissipated from the ground rail through an electrostatic discharge strike protection cell to a power rail.

In yet other instances, during normal operation of the driver, the method also includes generating an output driver control voltage in a buffer, applying the output driver control voltage to a gate of the output driver transistor through a leakage current blocking transistor, and turning on the leakage current blocking transistor with a voltage generated by a charge pump.

Other embodiments provide a driver including an inverter having an NMOS transistor and a PMOS transistor. The NMOS transistor has a source connected to a ground, a drain connected to an output of the inverter, and a gate connected to an input of the inverter. The PMOS transistor has a drain connected to the output of the inverter, a source connected to a battery input, and a gate connected to the input of the inverter. The driver also includes an electrostatic discharge dissipation cell having an anode terminal connected to the battery input and a cathode terminal connected to the ground. An LDMOS transistor in the driver has a source connected to the ground and a drain connected to an output of the driver. A leakage path blocking NMOS transistor has a source connected to the output of the inverter and a drain connected to a gate of the LDMOS transistor. The driver also includes a charge pump having an input connected to a second power source input and an output connected to a gate of the leakage path blocking NMOS transistor. The driver also includes a bias capacitor connected in parallel with the charge pump between the second power source input and the gate of the leakage path blocking NMOS transistor, preventing the leakage path blocking NMOS transistor from turning on during an ESD strike even if an external power supply bias capacitor is connected to the second power source input.

In various cases, a voltage level applied to the battery input of the driver has an operating range between about 6 volts and about 2.6 volts. A voltage level applied to the second power source input is about 2.3 volts, and the charge pump produces a voltage level at the output of the charge pump of about 6.9 volts.

In other cases, the leakage path blocking NMOS transistor in the driver has a gate to source voltage rating at least as great as the voltage level at the output of the charge pump.

This summary provides only a general outline of some exemplary embodiments. Many other objects, features, advantages and other embodiments will become more fully apparent from the following detailed description, the appended claims and the accompanying drawings.

BRIEF DESCRIPTION OF THE DRAWINGS

A further understanding of the various exemplary embodiments may be realized by reference to the figures which are described in remaining portions of the specification. In the figures, like reference numerals may be used throughout several drawings to refer to similar components.

DESCRIPTION

The drawings and description, in general, disclose apparatuses and methods for protecting a driver from electrostatic discharge. While the driver with electrostatic discharge protection is not limited to any particular load or output voltage, in one particular embodiment, the driver with electrostatic discharge protection may be used to power a series of light emitting diodes (LEDS) with an output voltage of about 40 V. In particular, the driver may include an open-drain power field effect transistor (FET) as a power stage FET that, when active, sinks current from the LEDS connected to the output at the drain of the FET, and when inactive, has a high impedance leaving the LEDS floating near the voltage of an external power source to which the LEDS are also connected. The power stage FET is a relatively large transistor in order to handle the high output current for a 40 V load, so an ESD protection cell in the integrated circuit capable of protecting the power stage FET would be undesirably large. The driver disclosed herein is self-protecting, meaning that the electrical charge from an ESD strike at the output of the power stage FET is dissipated through the channel of the power stage FET rather than building up and destroying the power stage FET and other connected devices. The self-protection disclosed herein for the driver turns on the power stage FET even when the driver is not connected in an electrical circuit or on a circuit board, using capacitive coupling from the drain to the gate of the power stage FET to use the charge of the ESD strike itself to turn on the power stage FET. The self-protection circuitry has minimal impact on the normal operation of the driver as will be described in more detail below.

Figure 1:
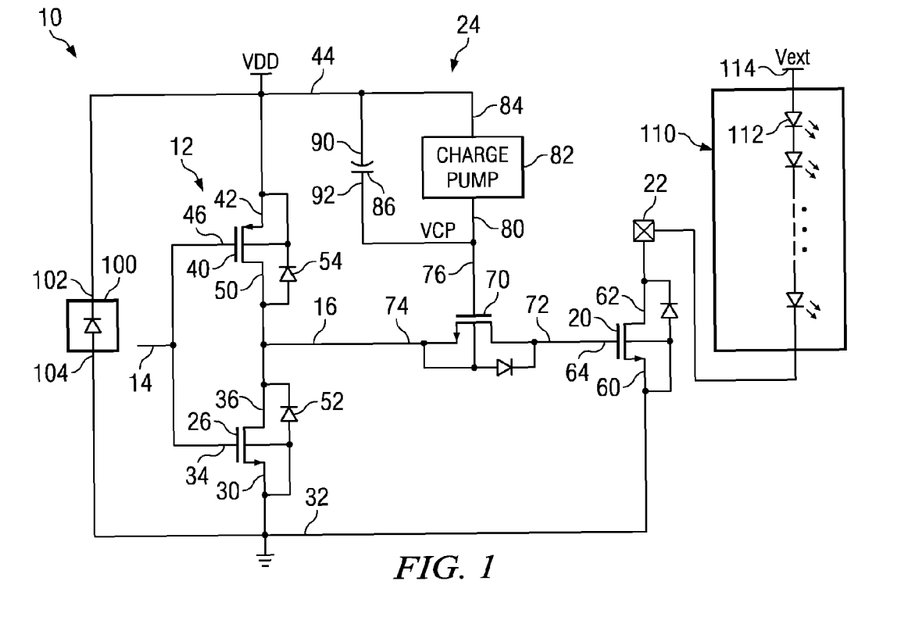
FIG. 1 is a schematic of an exemplary driver with a single power supply and electrostatic discharge protection as connected for normal operation.

Referring now to FIG. 1, an exemplary embodiment of the driver 10 with ESD self-protection will be described. Generally, a buffer or pre-driver 12 receives an input 14 from another circuit (not shown) that controls the driver 10 to turn the driver 10 on or off. The pre-driver 12 generates an output 16 that controls a power stage FET 20 that drives the output 22 of the driver 10. (The power stage FET 20 may also be referred to herein as an output driver.) Typically, the driver 10 is placed inside an integrated circuit at the output of the integrated circuit so that the output 22 is an output pin of the integrated circuit, although the driver 10 with ESD self-protection is not limited to this configuration. A leakage current blocking circuit 24 is disposed between the pre-driver 12 and the power stage FET 20 to protect the power stage FET 20 from an ESD strike to the driver output 22.

In one particular embodiment, the pre-driver 12 consists of an inverter having an n-channel metal-oxide-semiconductor (NMOS) transistor 26 with a source 30 connected to a ground rail 32, a gate 34 connected to the pre-driver input 14 and a drain 36 connected to the pre-driver output 16. The pre-driver 12 also includes a p-channel metal-oxide-semiconductor (PMOS) transistor 40 with a source 42 connected to a power rail 44, a gate 46 connected to the pre-driver input 14 and a drain 50 connected to the pre-driver output 16.

The power stage FET 20 of one particular embodiment is an open-drain power laterally diffused metal oxide semiconductor (LDMOS) FET, a high voltage NMOS transistor that sinks current from the driver output 22 to the ground rail 32 when turned on. The power stage FET 20 has a source 60 connected to the ground rail 32, a drain 62 connected to the driver output 22, and a gate 64 that, in the absence of a leakage current blocking circuit 24 would be connected to the pre-driver output 16. However, in one particular embodiment, the gate 64 of the power stage FET 20 is connected to the leakage current blocking circuit 24 to protect the power stage FET 20 during an ESD strike to the driver output 22 by turning on the power stage FET 20.

The leakage current blocking circuit 24 of one particular embodiment includes a leakage path blocking transistor 70, an NMOS transistor having a drain 72 connected to the gate 64 of the power stage FET 20, a source 74 connected to the pre-driver output 16 and a gate 76 connected to the output 80 of a charge pump 82. The input 84 of the charge pump 82 is connected to the power rail 44, so that during normal operation the gate 76 of the leakage path blocking transistor 70 is pulled to a higher voltage level than that at the power rail 44. The charge pump 82 may have any desired circuitry and configuration to boost the voltage at the output 80 above that at the input 84. For example, the charge pump 82 may include a switched capacitor circuit and a clock that transfers packets of charge to the internal capacitor (not shown). The voltages at the input 84 and output 80 of the charge pump 82 are not limited to any particular levels. In one particular embodiment, the voltage at the output 80 is about three times higher than that at the input 84, or enough to minimize the $R_{DS,\ ON}$ of the leakage path blocking transistor 70. Note that the $V_{GS}$ rating should be at least as great as the voltage at the output 80 of the charge pump 82 so that the leakage path blocking transistor 70 is not damaged by the voltage from the charge pump 82.

In another particular embodiment, the charge pump 82 could be omitted, although the leakage path blocking transistor 70 would have to be carefully selected and the gate voltage adapted so that the $V_{GS}$ was not clamping and the $R_{DS,\ ON}$ of the leakage path blocking transistor 70 was acceptably low, for example using a higher voltage power source. The charge pump 82 provides the advantage of creating a low $R_{DS,\ ON}$ even in a relatively small leakage path blocking transistor 70.

A bias capacitor 86 may be connected in parallel with the charge pump 82, with a negative plate 90 connected to the power rail 44 and a positive plate 92 connected to the gate 76 of the leakage path blocking transistor 70.

The driver 10 may also include an ESD protection cell 100 connected between the ground rail 32 and the power rail 44, with an anode terminal 102 connected to the power rail 44 and a cathode terminal 104 connected to the ground rail 32. The ESD protection cell 100 may comprise any suitable ESD protection cell, whether currently known or developed in the future. For example, the ESD protection cell 100 may include a bipolar junction transistor or diode that turns on more quickly in response to an ESD strike than the NMOS power stage FET 20. Note that although the terminals 102 and 104 of the ESD protection cell 100 are referred to as anode and cathode terminals, this does not imply or require that the ESD protection cell 100 contain a diode structure, but merely that current can flow substantially unimpeded from the cathode terminal 104 to the anode terminal 102 whenever the cathode terminal 104 is at a higher voltage than about that of the anode terminal 102. Furthermore, current can flow substantially unimpeded from the anode terminal 102 to the cathode terminal 104 when the anode terminal 102 has a voltage that is greater than the voltage at the cathode terminal 104 by at least the magnitude of a breakdown voltage of the ESD protection cell 100.

Although the driver 10 is not limited to any particular load or output voltage, one exemplary load 110 includes a series of LEDS (e.g., 112) connected between the driver output 22 and an external voltage source 114.

During normal operation, the pre-driver 12 inverts the signal at the pre-driver input 14, produces an inverted and buffered signal at the pre-driver output 16. When the pre-driver input 14 is low, the pre-driver output 16 is pulled up to a voltage near that at the power rail 44. The charge pump 82 is always on, setting the voltage $V_{CP}$ at the gate 76 of the leakage path blocking transistor 70 to a voltage higher than that at the power rail 44. The leakage path blocking transistor 70, having a $V_{GS}$ of about $V_{CP}-V_{DD}$, which is higher than the threshold voltage, is turned on and has a minimized $R_{DS,\ ON}$. The voltage at the gate 64 of the power stage FET 20 is pulled up to nearly the level at the power rail 44, turning on the power stage FET 20 and sinking current from the driver output 22 to the ground rail 32. Current therefore flows from the external voltage source 114 through the load 110 and into the driver output 22. When the pre-driver input 14 is high, the pre-driver output 16 is pulled down to a voltage near that at the ground rail 32. The leakage path blocking transistor 70 has a $V_{GS}$ of about $V_{CP}$, the voltage at the output 80 of the charge pump 82, and thus remains turned on. The gate 64 of the power stage FET 20 is thus pulled down, turning off the power stage FET 20 and leaving the driver output 22 in a high impedance state and blocking current through the load 110.

As mentioned above, the leakage current blocking circuit 24 protects the power stage FET 20 from damage during an ESD strike to the driver output 22 when the driver 10 is not in operation, such as when the power is off, or when the driver 10 is not properly connected in a circuit. In this state, the charge pump is off and the leakage path blocking transistor 70 does not conduct. Charge from the ESD strike to the driver output 22 is capacitively coupled to the gate 64 of the power stage FET 20. Because the leakage path blocking transistor 70 blocks the leakage current from the gate 64 of the power stage FET 20 to the pre-driver 12, charge builds up on the gate 64 and raises the gate-to-source voltage $V_{GS}$ of the power stage FET 20. This turns on the power stage FET 20 and allows the charge from the ESD strike to pass through the power stage FET 20 from drain 62 to source 60. This prevents the voltage from building up on the drain 62 above the rated voltage which would damage or destroy the power stage FET 20. In the absence of the leakage current blocking circuit 24, charge on the gate 64 of the power stage FET 20 due to capacitive coupling with the drain 62 would flow through the leakage path through the parasitic diode 54 in the pre-driver PMOS transistor 40, holding down the $V_{GS}$ of the power stage FET 20 and keeping it turned off. Charge from the ESD strike to the driver output 22 would raise the voltage on the drain 62, damaging the power stage FET 20. The operation of the leakage current blocking circuit 24 in various ESD strike scenarios will be described in more detail below with respect to FIGS. 3-5.

Figure 2:
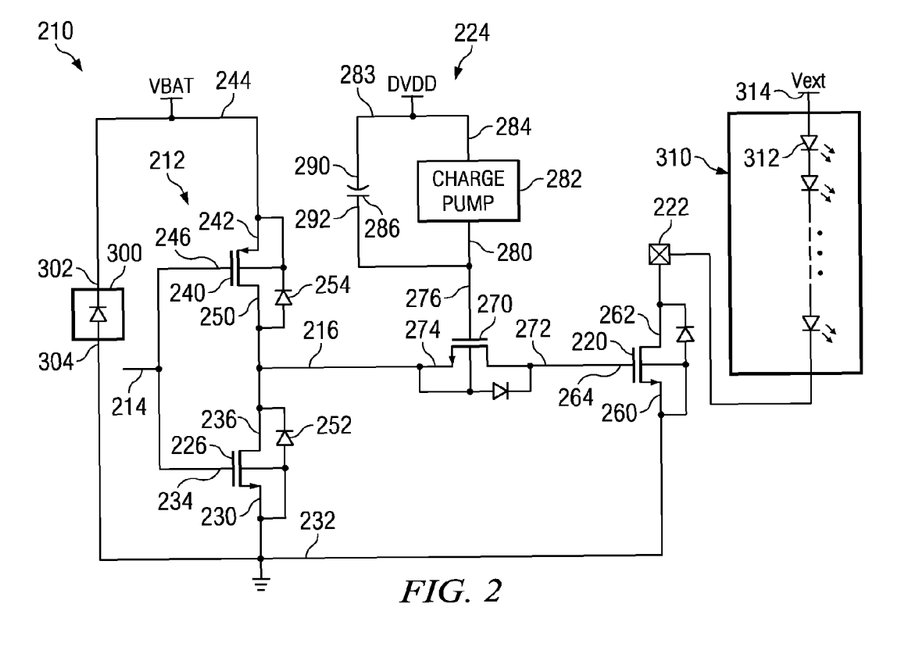
FIG. 2 is a schematic of an exemplary driver with dual power sources and electrostatic discharge protection as connected for normal operation.

Referring now to FIG. 2, another exemplary embodiment of a driver 210 with a leakage current blocking circuit 224 will be described. In this embodiment, two power sources are included, a battery and an internal digital power supply. A pre-driver 212 buffers and inverts the signal at an input 214 and generates a signal at an output 216 to control a power stage FET 220 that drives the output 222 of the driver 210. The pre-driver 212 consists of an inverter having an NMOS transistor 226 with a source 230 connected to a ground rail 232, a gate 234 connected to the pre-driver input 214 and a drain 236 connected to the pre-driver output 216. The pre-driver 212 also includes a PMOS transistor 240 with a source 242 connected to a battery power rail 244, a gate 246 connected to the pre-driver input 214 and a drain 250 connected to the pre-driver output 216. In one particular embodiment, the battery power rail 244 is connected to a lithium ion battery with a normal operating range of about 6 V when fully charged to about 2.6 V at the low end of the operating range.

The pre-driver NMOS transistor 226 has a leakage path toward the drain 236 through a parasitic diode 252, and the pre-driver PMOS transistor 240 has a leakage path toward the source 242 through a parasitic diode 254.

The power stage FET 220 of one particular embodiment is an n-channel LDMOS FET. The power stage FET 220 has a source 260 connected to the ground rail 232, a drain 262 connected to the driver output 222, and a gate 264 that is connected to the leakage current blocking circuit 224 to protect the power stage FET 220 during an ESD strike to the driver output 222.

The leakage current blocking circuit 224 includes a leakage path blocking transistor 270, an NMOS transistor having a drain 272 connected to the gate 264 of the power stage FET 220, a source 274 connected to the pre-driver output 216 and a gate 276 connected to the output 280 of a charge pump 282. The input 284 of the charge pump 282 is connected to second power rail 283, powered by an internal digital power source. In one particular embodiment, the voltage of the internal digital power source connected to the second power rail 283 is about 2.3 V. The charge pump boosts the voltage at the second power rail 283 by a factor of three, producing a voltage at the output 280 of about 6.9 V when the driver 210 is operating. The gate 276 of the leakage path blocking transistor 270 is thus pulled to a higher voltage level than that at the battery power rail 244, even when the battery is fully charged at 6 V. The charge pump 282 may have any desired circuitry and configuration to boost the voltage at the output 280 above that at the input 284, such as a switched capacitor circuit. The $V_{GS}$ rating should be at least as great as the voltage at the output 280 of the charge pump 282 so that the leakage path blocking transistor 270 is not damaged by the voltage from the charge pump 282. In one particular embodiment, the leakage path blocking transistor 270 is a 7 V NMOS transistor.

A bias capacitor 286 is connected in parallel with the charge pump 282, with a negative plate 290 connected to the second power rail 283 and a positive plate 292 connected to the gate 276 of the leakage path blocking transistor 270.

The driver 210 also includes an ESD protection cell 300 connected between the ground rail 232 and the battery power rail 244, with an anode terminal 302 connected to the battery power rail 244 and a cathode terminal 304 connected to the ground rail 232.

Although the driver 210 is not limited to any particular load or output voltage, one exemplary load 310 includes a series of LEDS (e.g., 312) connected between the driver output 222 and an external voltage source 314.

During normal operation, the pre-driver 212 inverts the signal at the pre-driver input 214, produces an inverted and buffered signal at the pre-driver output 216. When the pre-driver input 214 is low, the pre-driver output 216 is pulled up to a voltage near that at the battery power rail 244. The charge pump 282 is always on, setting the voltage $V_{CP}$ at the gate 276 of the leakage path blocking transistor 270 to 6.9 V, higher than that $V_{BAT}$ at the battery power rail 244 even when the battery is at a full charge of 6 V. The leakage path blocking transistor 270 has a $V_{GS}$ of about $V_{CP}$-$V_{BAT}$ that ranges from about 4.3 V to 0.9 V across the operating range of the battery. This is higher than the threshold voltage of the leakage path blocking transistor 270, turning on the leakage path blocking transistor 270 and minimizing the $R_{DS, ON}$. The voltage at the gate 264 of the power stage FET 220 is pulled up to nearly the level at the battery power rail 244 (between about 2.6 V and 6 V), turning on the power stage FET 220 and sinking current from the driver output 222 to the ground rail 232. Current therefore flows from the external voltage source 314 through the load 310 and into the driver output 222. When the pre-driver input 214 is high, the pre-driver output 216 is pulled down to a voltage near that at the ground rail 232. The leakage path blocking transistor 270 has a $V_{GS}$ of about $V_{CP}$ or 6.9 V, and thus remains turned on. The gate 264 of the power stage FET 220 is thus pulled down by the output 216 through the leakage path blocking transistor 270, turning off the power stage FET 220 and leaving the driver output 222 in a high impedance state and blocking current through the load 310.

As mentioned above, the leakage current blocking circuit 224 protects the power stage FET 220 from damage during an ESD strike to the driver output 222 when the driver 210 is not in operation, such as when the power is off, or when the driver 210 is not properly connected in a circuit. In this state, the charge pump 282 is off and the leakage path blocking transistor 270 does not conduct. Charge from the ESD strike to the driver output 222 is capacitively coupled to the gate 264 of the power stage FET 220. Because the leakage path blocking transistor 270 blocks the leakage current from the gate 264 of the power stage FET 220 to the pre-driver 212, charge builds up on the gate 264 and raises the gate-to-source voltage $V_{GS}$ of the power stage FET 220. This turns on the power stage FET 220 and allows the charge from the ESD strike to pass through the power stage FET 220 from drain 262 to source 260. This prevents the voltage from building up on the drain 262 above the rated voltage which would damage or destroy the power stage FET 220. In the absence of the leakage current blocking circuit 224, charge on the gate 264 of the power stage FET 220 due to capacitive coupling with the drain 262 would flow through the leakage path through the parasitic diode 254 in the pre-driver PMOS transistor 240, holding down the $V_{GS}$ of the power stage FET 220 and keeping it turned off. Charge from the ESD strike to the driver output 222 would raise the voltage on the drain 262, damaging the power stage FET 220.

Figure 3:
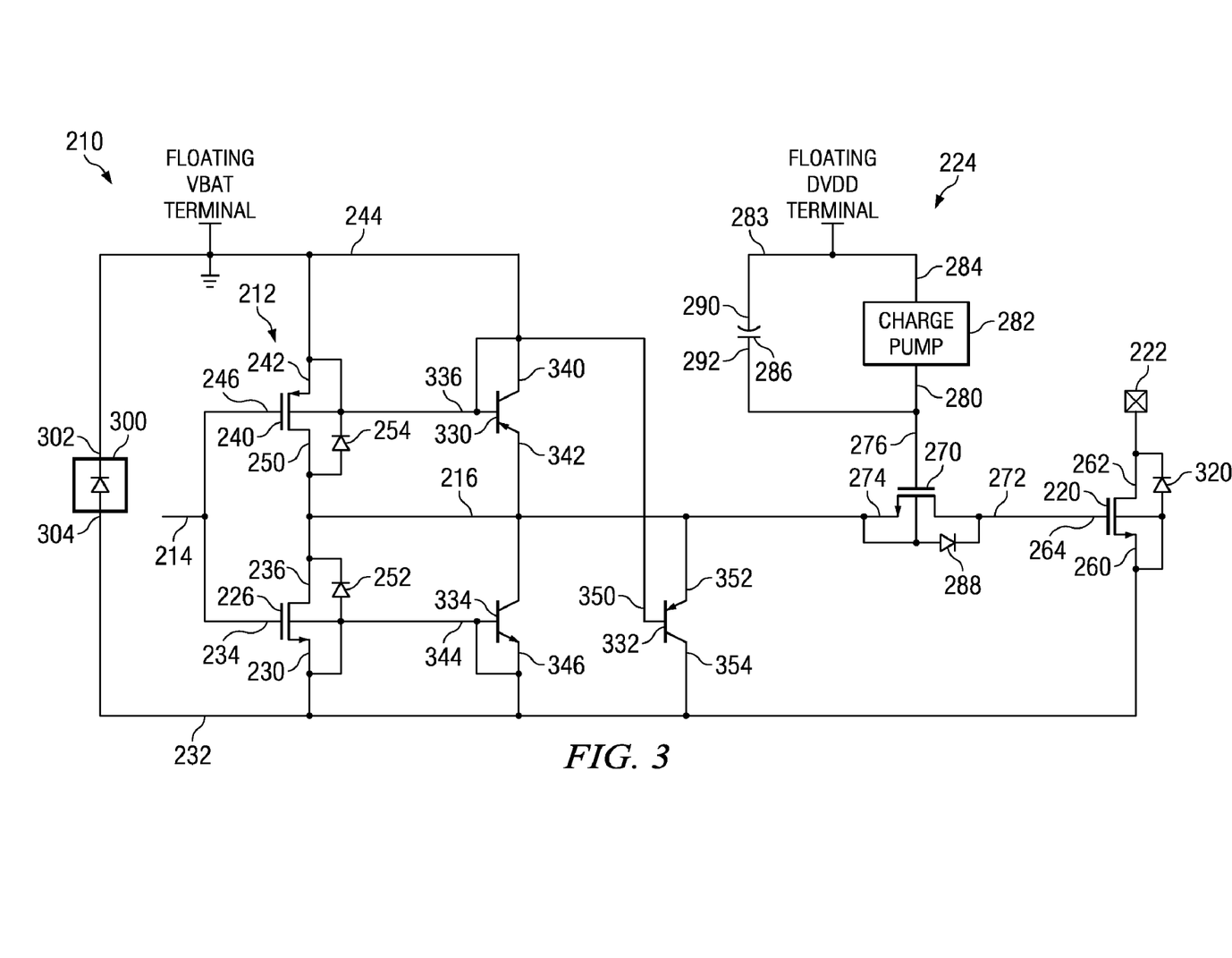
FIG. 3 is a schematic of an exemplary driver with dual power sources and electrostatic discharge protection before proper connection in a circuit or as connected for ESD testing for positive ESD strikes with respect to a power rail.

Referring now to FIG. 3, the operation of a driver 210 with an leakage current blocking circuit 224 in various ESD strike scenarios will be described in more detail. The driver 210 is particularly vulnerable to ESD strikes on the driver output 222 when the driver 210 is not properly connected in a circuit to a ground and power rail. Four different circuit configuration and ESD strike combinations will be considered. The ESD strikes will be discussed with respect to a driver 210 having two power sources 244 and 283 as in FIG. 2, but the discussion is equally applicable to the single power source driver 10 of FIG. 1.

In a first scenario, the ground rail 232 of the driver 210 is floating and the battery power rail 244 is grounded (as illustrated in FIG. 3), and a positively charged ESD strike occurs at the output 222. The second power rail 283 may be floating or grounded for the purposes of the discussion. In a second scenario, the power rails 244 and 283 are floating and the ground rail 232 is grounded, and a positively charged ESD strike occurs at the output 222. In a third scenario, the ground rail 232 of the driver 210 is floating and the battery power rail 244 is grounded (as illustrated in FIG. 3), and a negatively charged ESD strike occurs at the output 222. Again, the second power rail 283 may be floating or grounded for the purposes of the discussion. In a fourth scenario, the power rails 244 and 283 are floating and the ground rail 232 is grounded, and a positively charged ESD strike occurs at the output 222. These various configurations of the power and ground rails may occur with improper connection of the integrated circuit containing the driver 210 to a circuit board, or before the integrated circuit is connected, such as during manual handling after fabrication and before connection. Because these four scenarios are unfortunately more common than one would like, integrated circuits may be tested in these four scenarios during the manufacturing process.

In the third and fourth scenarios with negative ESD strikes and grounded power rail and ground rail, the power stage FET 220 in the driver 210 is able to survive without damage without the aid of the leakage current blocking circuit 224 due to the leakage path through the parasitic diode 320 in the power stage FET 220. With the grounded power rail 244 or ground rail 232 being at a more positive potential than the output 222 of the driver 210, when a negatively charged ESD strike hits the output 222, current will flow through the parasitic diode 320 in the power stage FET 220. If the battery power rail 244 is grounded and the ground rail 232 is floating as in the scenario, the current will also flow through the ESD protection cell 300 from battery power rail 244 to ground rail 232 when the voltage differential across the ESD protection cell 300 exceeds its breakdown voltage. Thus, in both negative ESD strike scenarios dangerous voltage differentials across the power stage FET 220 will not build up.

In the second scenario with a positive ESD strike with respect to ground, the ground rail 232 is grounded and the battery power rail 244 and second power rail 283 are floating. In this scenario, the power stage FET 220 may survive the ESD strike without the leakage path blocking transistor 270 if the parasitic diode 252 in the NMOS transistor 226 of the pre-driver 212 is sufficient to turn on the power stage FET 220, which will not always be the case. Another leakage path does exist which will be described in more detail below which may prevent the power stage FET 220 from turning on without the leakage path blocking transistor 270. If the leakage path blocking transistor 270 is in place, the parasitic diode 288 in the leakage path blocking transistor 270 blocks the leakage path to ground so that the voltage on the gate 264 of the power stage FET 220 rises. The power stage FET 220 is thus turned on, allowing the current from the ESD strike to flow from the output 222 through the power stage FET 220 to ground at the ground rail 232.

In the first positive ESD strike scenario the leakage current blocking circuit 224 is critical in protecting the power stage FET 220 from damage. In the first scenario, the battery power rail 244 is grounded and the ground rail 232 is floating. The second power rail 283 may be grounded or may be floating. An ESD strike with a potential that is positive with respect to the ground at the battery power rail 244 is received at the output 222 of the driver 210, or a simulated ESD strike is applied to the output 222 during testing. Because the ground rail 232 is floating and the pump 282 is not operating, the $V_{GS}$ between the source 274 and gate 276 of the leakage path blocking transistor 270 does not exceed the voltage threshold VT required to turn on the leakage path blocking transistor 270. The drain 272 of the leakage path blocking transistor 270 is in a high impedance state, and the parasitic diode 288 of the leakage path blocking transistor 270 blocks the leakage path from drain 272 to source 274, leaving the gate 264 of the power stage FET 220 floating. Capacitive coupling between the drain 262 and the gate 264 of the power stage FET 220 raises the voltage of the gate 264. The path from the ground rail 232 to battery power rail 244 through the ESD protection cell 300 and the leakage path through the parasitic diodes 252 and 254 of the NMOS transistor 226 and PMOS transistor 240 in the pre-driver 212 allows current to flow from the ground rail 232 to the battery power rail 244, holding the source 260 of the power stage FET 220 near ground. The $V_{GS}$ of the power stage FET 220 thus rises, turning on the power stage FET 220 and allowing current to flow from drain 262 to source 260 in the power stage FET 220 and holding the voltage at the drain 262 down within the safe operating area (SOA). The current further flows from the ground rail 232 to the battery power rail 244 primarily through the ESD protection cell 300 but also through the leakage path through the parasitic diodes 252 and 254 of the NMOS transistor 226 and PMOS transistor 240 in the pre-driver 212. Thus we see that in all four ESD scenarios, the power stage FET 220 in the driver 210 can safely survive an ESD strike to the output 222.

The leakage paths from the gate 264 of the power stage FET 220 that are blocked by the leakage path blocking transistor 270 will now be described in more detail. There are three potential leakage paths from the gate of the LDMOS, represented as parasitic bipolar junction transistors (BJTS) 330, 332 and 334. The first 330 is a lateral PNP BJT (representing the same leakage path as the parasitic body diode 254), the second 332 is a substrate PNP BJT and the third 334 is a lateral NPN (representing the same leakage path as the parasitic body diode 252). In this particular embodiment, the back gates are tied to the sources of the pre-driver transistors 234 and 240. Specifically, the back gate 336 or base of the lateral PNP 330 is tied to the source 242 of the PMOS transistor 240. The collector 340 of the lateral PNP 330 is also connected to the source 242 of the PMOS transistor 240 and is thus shorted to the base 336, creating a forward diode connection and allowing leakage current to flow from the emitter 342 to the collector 340. The back gate 344 or base and the emitter 346 of the lateral NPN 334 are tied to the source 230 of the NMOS transistor 226. Because the base 344 and emitter 346 of the lateral NPN 334 are shorted together, the lateral NPN 334 is turned off and does not present a leakage path in this case.

In the first scenario, a positive ESD strike with the battery power rail 244 grounded and the ground rail 232 floating, without the leakage path blocking transistor 270 the lateral PNP 330 will leak current to the grounded battery power rail 244 with a 0.7 V drop in potential. This ties the gate 264 of the power stage FET 220 at 0.7 V. The source 260 of the power stage FET 220 is also at 0.7 V due to the 0.7 V drop across the ESD protection cell 300. The substrate PNP 332 also has a shoot through leakage current from the (gate to the ground). The base 350 is floating. The emitter 352 is connected to the drain 236 of the NMOS transistor 226 and thus to the gate 264 of the power stage FET 220. During an ESD strike, the voltage on the emitter 352 rises due to capacitive coupling from the drain 262 of the power stage FET 220. When the emitter 352 voltage rises, because the base 350 is floating, the substrate PNP 332 also conducts a leakage current from the emitter 352 to the collector 354. Thus, both the lateral PNP 330 and the substrate PNP 332 have a leakage current holding the gate 264 of the power stage FET 220 at 0.7 V and the $V_{GS}$ at 0 V. With a $V_{GS}$ of 0 V, the power stage FET 220 is turned off and the drain voltage VD builds to a damaging level. The leakage path blocking transistor 270 blocks these leakage currents during an ESD strike in the first scenario, protecting the power stage FET 220.

In the second scenario, a positive ESD strike with the battery power rail 244 floating and the ground rail 232 grounded (not shown in FIG. 3), without the leakage path blocking transistor 270 the lateral NPN 334 does not present a leakage current path as discussed above because the base back gate 344 and emitter 346 are shorted. However, the substrate PNP 332 does present a leakage current path because the base 350 is floating in this scenario. When the voltage on the gate 264 begins to rise, the voltage at the emitter 352 of the substrate PNP 332 rises, also pulling up the voltage on the floating base 350 and causing the 332 to conduct. This ties the gate 264 of the power stage FET 220 at 0.7 V, keeping the power stage FET 220 turned off so that the drain voltage VD builds to a damaging level. The leakage path blocking transistor 270 blocks this leakage current during an ESD strike in the second scenario, protecting the power stage FET 220.

Figure 4:
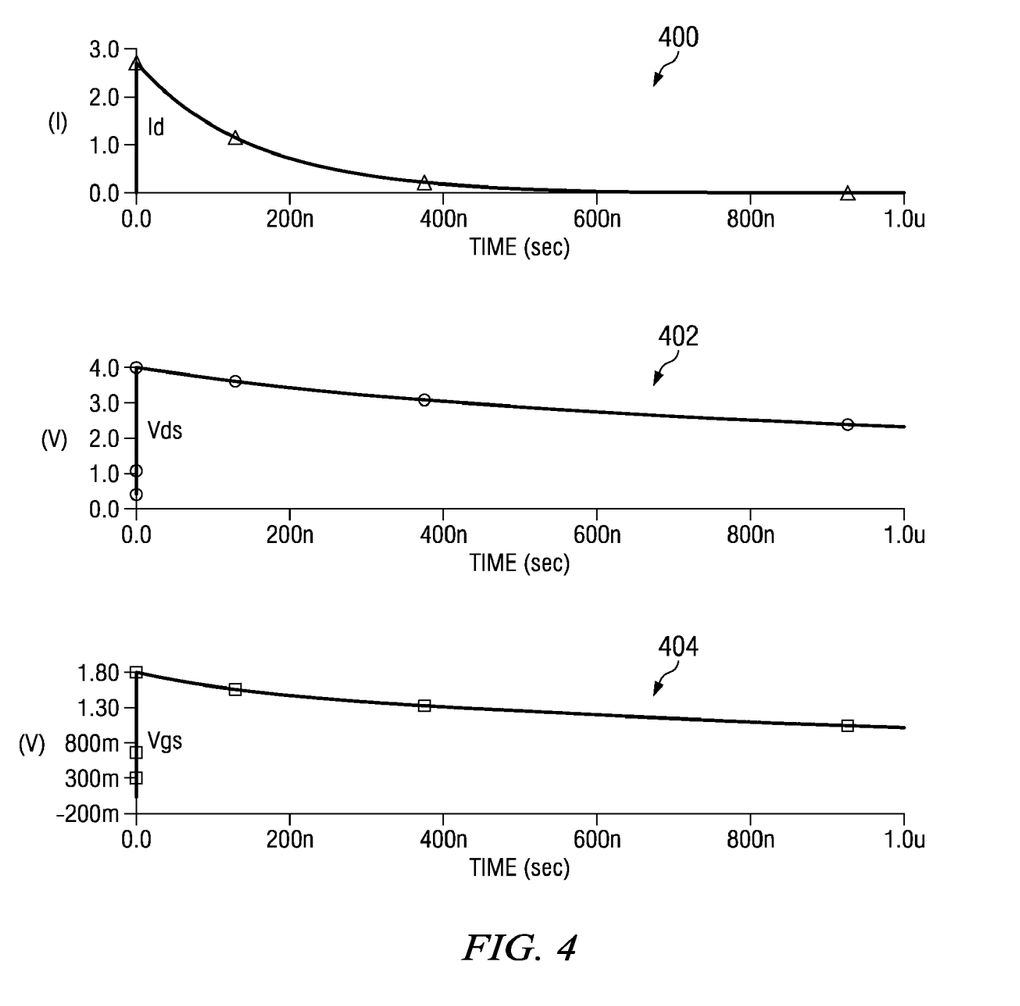
FIG. 4 is a transient response plot of current, drain-to-source voltage and gate-to-source voltage in an output driver with electrostatic discharge protection in place for a positive ESD strike with respect to VDD.
Figure 5:
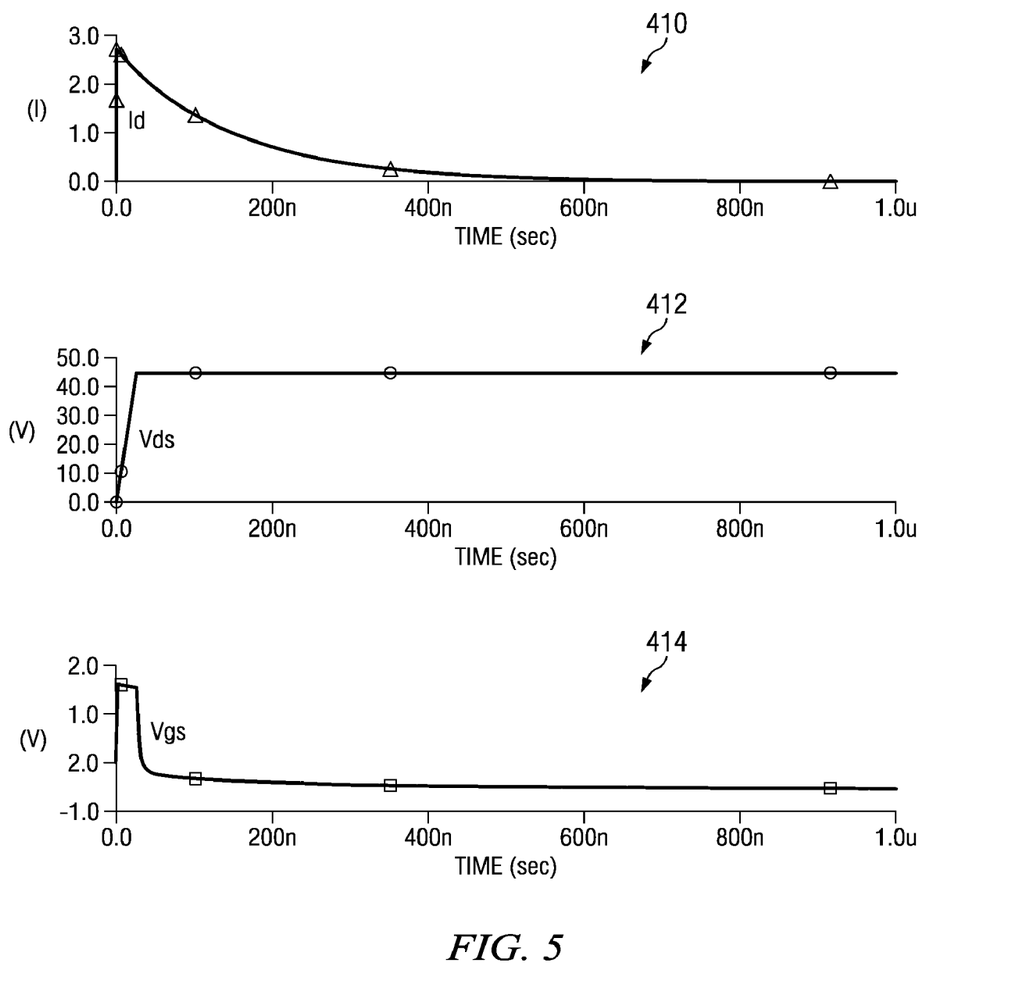
FIG. 5 is a transient response plot of current, drain-to-source voltage and gate-to-source voltage in an output driver without electrostatic discharge protection in place.

The transient response of the driver 210 with and without the leakage path blocking transistor 270 in the first ESD scenario is illustrated in FIGS. 4 and 5. The transient response plots of FIG. 4 illustrate the drain current $I_D$ 400, the drain-to-source voltage $V_{DS}$ 402 and the gate-to-source voltage $V_{GS}$ 404 of the power stage FET 220 when the leakage path blocking transistor 270 is included in the driver 210 and a positive ESD strike is received. Note that the drain current $I_D$ 400 during an ESD strike on the order of one or two thousand volts initially rises to about 2.8 A and rapidly decreases to 0 A. The gate-to-source voltage $V_{GS}$ 404 rises to about 1.8 V through capacitive coupling from the drain 262, turning on the power stage FET 220 and allowing the drain current $I_D$ 400 to flow through the power stage FET 220. Thus, the drain-to-source voltage $V_{DS}$ 402 peaks at about 4 V, within the safe operating area of the power stage FET 220.

The transient response plots of FIG. 5 illustrate the drain current $I_D$ 410, the drain-to-source voltage $V_{DS}$ 412 and the gate-to-source voltage $V_{GS}$ 414 of the power stage FET 220 when the leakage path blocking transistor 270 is not included in the driver 210 and a positive ESD strike according to the first scenario is received. Note that the drain current $I_D$ 410 during the ESD strike on the order of one or two thousand volts initially rises to about 2.8 A due to capacitive coupling and rapidly decreases to 0 A. The gate-to-source voltage $V_{GS}$ 414 rises to about 1.5 V through capacitive coupling from the drain 262 but rapidly decreases to a negative potential due to current through the leakage path through the parasitic diode 254 of the PMOS transistor 240 in the pre-driver 212, keeping the power stage FET 220 turned off. The drain-to-source voltage $V_{DS}$ 412 thus rises to about 45 V, destroying the power stage FET 220.

Figure 6:
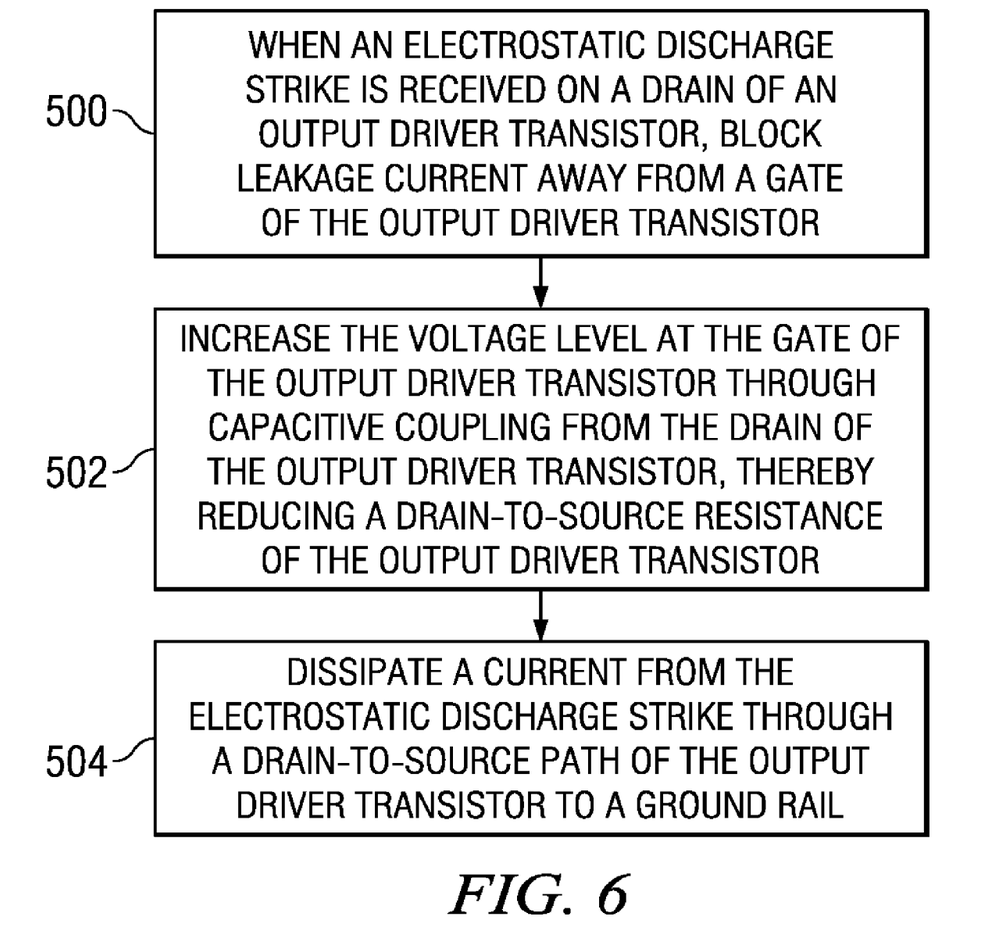
FIG. 6 is a flow chart of an exemplary operation for protecting a driver from electrostatic discharge.

Turning now to FIG. 6, an exemplary method of protecting a driver from electrostatic discharge will be summarized. The method includes, when an electrostatic discharge strike is received on a drain of an output driver transistor, blocking leakage current away from a gate of the output driver transistor. (Block 500) The voltage level at the gate of the output driver transistor is increased through capacitive coupling from the drain of the output driver transistor, thereby reducing a drain-to-source resistance of the output driver transistor. (Block 502) A current from the electrostatic discharge strike is dissipated through a drain-to-source path of the output driver transistor to a ground rail. (Block 504) The method may also include dissipating the current from the electrostatic discharge strike from the ground rail through an electrostatic discharge strike protection cell to a power rail, when the power rail is grounded and the ground rail is floating. During normal operation, the method may include generating an output driver control voltage in a buffer, applying the output driver control voltage to a gate of the output driver transistor through a leakage current blocking transistor, and turning on the leakage current blocking transistor with a voltage generated by a charge pump.

The driver with self-protection from ESD strikes disclosed herein provides a number of benefits. The ESD protection circuit may be inserted into an existing driver design without modifying the driver design. The size of the ESD protection is much smaller than a traditional ESD protection cell for high voltage drivers. The effect on normal operation is minimized by the low $R_{DS, ON}$ of the leakage path blocking transistor 70 and 270. No leakage path is introduced during normal operation by the ESD protection circuit. The driver with self-protection disclosed herein thus provides a compact and efficient ESD protection mechanism without compromising normal operation that enables the driver to survive various different ESD strike scenarios.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. An apparatus comprising:
   a pin;
   a first power terminal;
   a second power terminal;
   an inverter having an input terminal and an output terminal, wherein the inverter is coupled between the first power terminal and ground;
   an electrostatic discharge element that is coupled between the first power terminal and ground;
   a charge pump that is coupled to the second power terminal;
   a biasing capacitor that is coupled to the second power terminal;
   a blocking N-channel metal-oxide-semiconductor (NMOS) transistor that is coupled to the output terminal of the inverter at its source and that is coupled to the to the charge pump and the capacitor at its gate, wherein the blocking NMOS transistor includes a body diode that is configured to operate as a blocking diode; and
   an output transistor that is coupled to the pin at its drain, to ground at its source, and the drain of the blocking NMOS transistor at its gate.

2. The apparatus of claim 1, wherein the inverter further comprises:
   a P-channel metal-oxide-semiconductor (PMOS) transistor that is coupled to the first power terminal at its source, the input terminal of the inverter at its gate, and the output terminal of the inverter at its drain; and
   a first NMOS transistor that is coupled to ground at its source, the input terminal of the inverter at its gate, and the output terminal of the inverter at its drain.

3. The apparatus of claim 2, wherein the first and second power terminals are coupled together.

4. The apparatus of claim 2, wherein each of the first and second power terminals are floating.

5. The apparatus of claim 2, wherein the output transistor further comprises a field effect transistor.

6. The driver of claim 2, wherein the output transistor further comprises a laterally diffused MOS (LDMOS) transistor.

7. The apparatus of claim 2, wherein a voltage level applied to the first power terminal has an operating range between about 6 volts and about 2.6 volts, and wherein a voltage level applied to the second power terminal is about 2.3 volts, and wherein the charge pump produces a voltage level at the output of the charge pump of about 6.9 volts.

* * * * *